(12) United States Patent  
Cheng et al.

(10) Patent No.: US 10,135,550 B1  
(45) Date of Patent: Nov. 20, 2018

(54) WIRELESS TRANSMITTER CALIBRATION

(71) Applicant: PERASO TECHNOLOGIES INC., Toronto (CA)

(72) Inventors: Gary Cheng, Unionville (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 0 days.

(21) Appl. No.: 15/805,258

(22) Filed: Nov. 7, 2017

(51) Int. Cl.
  *H04B 17/14* (2015.01)
  *H04B 17/13* (2015.01)
  *H04L 27/38* (2006.01)
  *H04B 17/21* (2015.01)
  *H04L 27/34* (2006.01)

(52) U.S. Cl.
  CPC ............ *H04B 17/14* (2015.01); *H04B 17/13* (2015.01); *H04B 17/21* (2015.01); *H04L 27/3863* (2013.01); *H04L 27/34* (2013.01)

(58) Field of Classification Search
  CPC ..... H04B 17/21; H04B 1/0475; H03L 7/0802; H03L 7/099; H03L 7/104
  USPC ........................... 375/224, 297, 346; 455/87
  See application file for complete search history.

(56) References Cited

U.S. PATENT DOCUMENTS

| | | | |
|---|---|---|---|
| 2011/0218755 A1* | 9/2011 | Dhayni | G01R 31/31716 702/117 |
| 2013/0122956 A1* | 5/2013 | Lee | H04W 52/04 455/522 |
| 2015/0017931 A1* | 1/2015 | Devison | H03F 1/0227 455/95 |

* cited by examiner

*Primary Examiner* — Leila Malek
(74) *Attorney, Agent, or Firm* — Perry & Currier Inc.

(57) ABSTRACT

A calibration signal is transmitted from a transmitter antenna. A receiver antenna receives a loopback signal that results from an air coupling of the receiver antenna and the transmitter antenna. The loopback signal is compared to a target. If the loopback signal does not meet the target, then a gain of the calibration signal is adjusted and the loopback signal is again checked against the target. When the loopback signal meets the target, the gain is taken as a calibrated transmitter gain.

12 Claims, 6 Drawing Sheets

WIRELESS TRANSMITTER CALIBRATION

FIELD

The present disclosure relates to wireless communications.

BACKGROUND

The performance of a wireless communications device or system may vary based on a number of factors. Manufacturing differences among otherwise identical components may cause inconsistent performance. The temperature of a device, system, or circuit may also affect performance. Variance in performance may be unpredictable. One type of performance issue that occurs in wireless communications is transmitter compression, which is particularly problematic in quadrature amplitude modulation (QAM) 16 and higher constellations.

SUMMARY

According to one aspect of this disclosure, a device includes a transmitter antenna, a receiver antenna, and a circuit including a transmit path and a receive path. The transmit path is to communicate transmit signals to the transmitter antenna for wireless transmission. The receiver antenna is to receive wireless signals and provide the wireless signals to the receive path. The device further includes a controller to provide a calibration signal to the transmit path and obtain from the receive path a loopback signal caused by wireless reception of the calibration signal by the receiver antenna. The controller is to reference the loopback signal to calibrate the transmit path.

According to another aspect of this disclosure, a device includes a transmitter including a transmitter antenna and a receiver including a receiver antenna. The device further includes a circuit to communicate signals between a processor and the transmitter and between the processor and the receiver. The circuit is to transmit a calibration signal using the transmitter and obtain a loopback signal from the receiver due to over-the-air coupling of the receiver and the transmitter. The circuit is to control the transmitter based on the loopback signal.

According to another aspect of this disclosure, a method of calibrating a transmitter includes transmitting a calibration signal from a transmitter antenna and receiving a loopback signal at a receiver antenna, the loopback signal resulting from an air coupling of the receiver antenna and the transmitter antenna. The method further includes comparing the loopback signal to a target and, if the loopback signal does not meet the target, then adjusting a gain of the calibration signal and performing the receiving and comparing to determine whether the loopback signal meets the target. The method further includes when the loopback signal meets the target, taking the gain as a calibrated transmitter gain.

DETAILED DESCRIPTION

An air coupling between a receiver antenna and a transmitter antenna may be used to calibrate a transmit path. A known calibration signal is transmitted and a loopback signal received through the air coupling is digitized and compared to a target. When the target is not met, an iteration is performed to adjust transmitter gain in the radio frequency (RF) domain, in the digital domain, or in both domains. When the loopback signal meets the target, the gain is taken as a calibrated transmitter gain. This may be done independently over any number of channels and modulation types. Calibration in this way may improve performance and reduce or negate the effects of changing operating temperature, such as during initial warm up.

Figure 1:
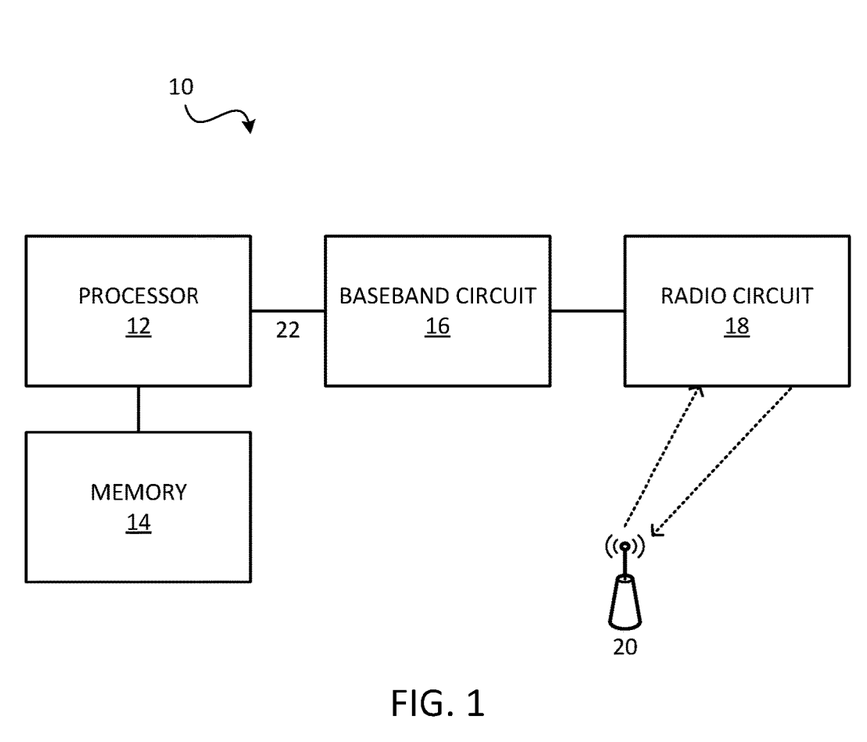
FIG. 1 is a block diagram of a wireless communications system.

FIG. 1 shows a wireless communications system 10. The wireless communications system 10 includes a processor 12, memory 14, a baseband circuit 16, radio circuit 18, and a wireless network 20, which may include a network access point, radio tower, other wireless communications system, or similar.

The processor 12 and memory 14 may be provided in a computer device, such as a notebook computer, tablet computer, smartphone, or the like. The baseband circuit 16 and the radio circuit 18 may be provided separate from the computer device in, for example, a wireless communications device, which may be connected to the computer device to provide wireless functionality to the computer device. The processor 12, memory 14, baseband circuit 16, and radio circuit 18 may be provided as integrated together in a computer device. The baseband circuit 16 and the radio circuit 18 may be provided as a wireless chipset for integration into a computer device, a removable Universal Serial Bus (USB) key that contains such a chipset, a wireless network adaptor, or similar. A connection 22 between the processor 12 and the baseband circuit 16 may be permanent or disconnectable. The connection 22 may include a bus, USB conductors, a USB port or receptacle, or similar.

The processor 12 and memory 14 cooperate to execute stored instructions to provide desired user functionality to the system 10. To implement user functionality, the system 10 may include a user interface, a display device, and similar.

The processor 12 may include a central processing units (CPU), a microcontroller, a controller, a microprocessor, a processing core, a field-programmable gate array (FPGA), or similar device capable of executing instructions.

The memory 14 may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

The baseband circuit 16 provides an interface between the processor 12 and the wireless network 20. The baseband circuit 16 manages radio communications functionality and controls the radio circuit 18 to wirelessly communicate data with the wireless network 20. The baseband circuit 16 and radio circuit 18 may implement communications according to any suitable standard or guideline, such as Institute of Electrical and Electronics Engineers (IEEE) 802.11ad, also referred to as WiGig, which employs frequencies of about 57 GHz to about 66 GHz. Any number of modulation techniques may be implemented, such as binary phase-shift keying (BPSK), quadrature phase-shift keying (QPSK), QAM, such as QAM16 and higher constellations, and similar.

The baseband circuit 16 and the radio circuit 18 are controlled to use an over-the-air loopback coupling to control the transmission power of the radio circuit 18. A transmission power back-off calibration may be used to set a gain of the transmit-chain of the radio circuit 18 to avoid excessive compression in the transmitter, as compression can undesirably distort transmit packets which may limit error vector magnitude (EVM). Packets may be distorted to the point where they cannot be decoded by a receiver. This may be a problematic issue for various modulation types, with QAM16 and higher constellations being particularly sensitive. A calibration process determines a suitable transmission gain to increase or maximize transmission power for various modulation types, while providing sufficient back-off.

Figure 2:
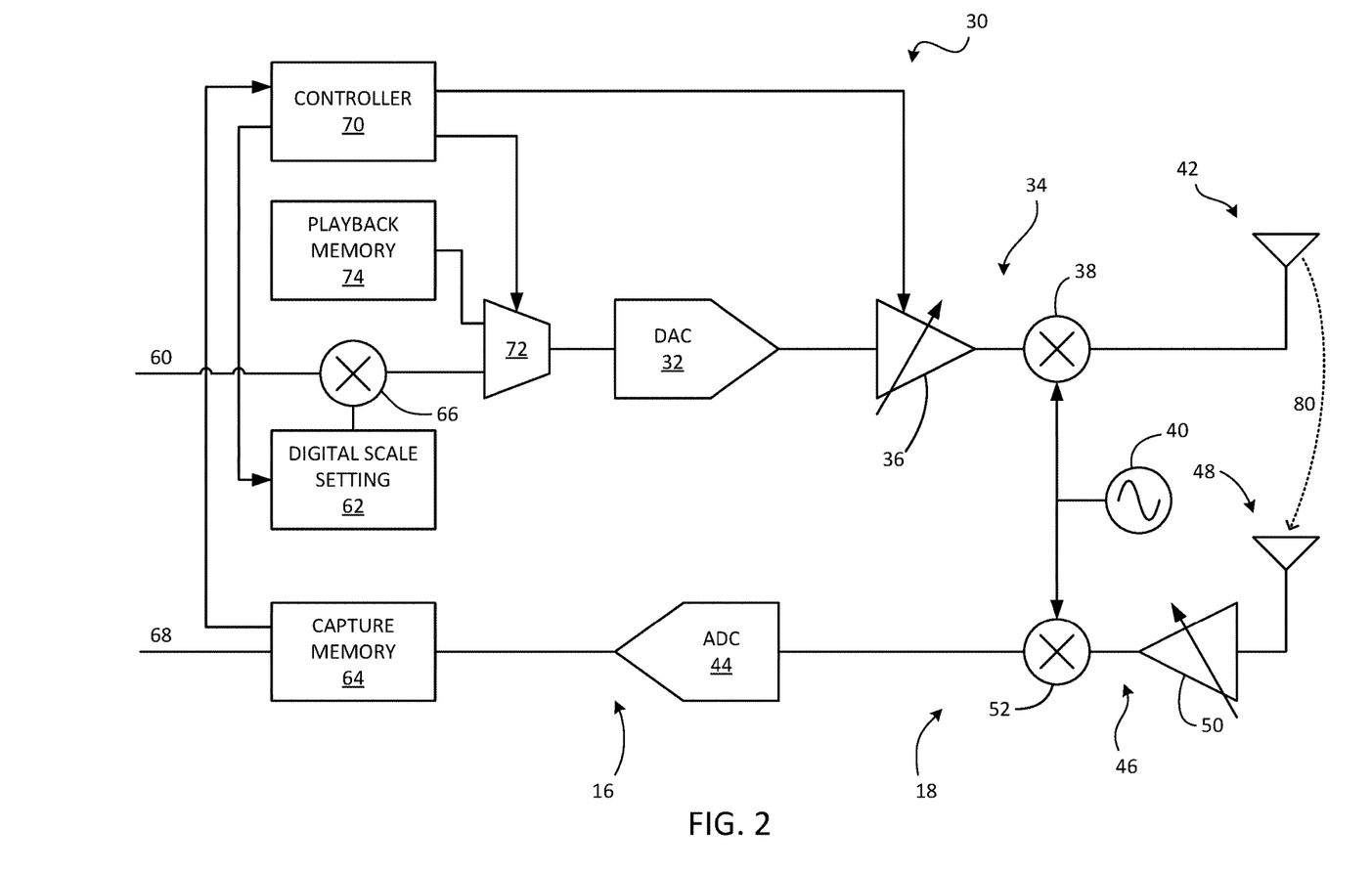
FIG. 2 is a schematic diagram of a wireless communications circuit.

FIG. 2 shows a wireless communications circuit 30. The circuit 30 may include a baseband circuit 16 and a radio circuit 18, such as those discussed elsewhere herein.

The wireless communications circuit 30 may include a digital-to-analog converter (DAC) 32 having an output at a transmit path 34 of the circuit 30. The transmit path 34 may include a radio transmitter that may include a variable-gain amplifier 36 and mixer 38 to adjust the gain and mix the analog signal outputted by the DAC 32 with a signal from a local oscillator 40 for transmission at a transmitter antenna 42. The amplifier 36 and mixer 38 are schematic and multiple of such transmit channels may be provided.

The wireless communications circuit 30 may include an analog-to-digital converter (ADC) 44 having an input at a receive path 46 of the circuit 30. The receive path 46 may include a radio receive that may include a receiver antenna 48 connected to a variable-gain amplifier 50 and mixer 52 to adjust the gain and mix a received signal with a signal from the local oscillator 40 for output to the ADC 44. The amplifier 50 and mixer 52 are schematic and multiple of such receiver channels may be provided.

The wireless communications circuit 30 further includes a data input 60 that provides a digital signal for conversion by the ADC 44. The data input 60 may be connected to, for example, the processor 12 (FIG. 1), digital signal processor (DSP), a modulator, a data bus, or another component that is a source of digital signals. The circuit 30 further includes a digital scale setting 62 and a multiplier 66 to apply the digital scale setting 62 to the input signal 60. The digital scale setting 62 may be combined with programmable mask filter coefficients and may be scaled to adjust a digital gain of the digital signal.

The wireless communications circuit 30 further includes capture memory 64 for storing received signals that have been digitized by the ADC 44. The capture memory 64 may provide digital received signals to a destination for digital signals, such as the processor 12 (FIG. 1), a DSP, a demodulator, a data bus, or another component, via a data output 68.

The wireless communications circuit 30 further includes a controller 70 and playback memory 74 that stores a calibration signal. Input of the DAC 32 may be switched between the data input 60 and the playback memory 74, as controlled by the controller 70. A multiplexer 72 is representative of such switching functionality, but it should be recognized that switching may be implemented by instructions executed by the controller 70. During normal operation, the data input 60 feeds the DAC 32. During calibration of the transmitter, the playback memory 74 feeds the DAC 32. The controller 70 may select the input to the DAC 32 to be the calibration signal playback memory 74 or the data input 60 according to any suitable calibration trigger or condition.

An air-coupling 80 of the transmitter and receiver antennas 42, 48 result in a received signal providing information regarding transmitter compression. The controller 70 may also be connected to the capture memory 64 to obtain received data, particularly, loopback data received via the air-coupling of the antennas 42, 48. Spacing of the antennas 42, 48 should be considered during implementation to avoid overpowering the receiver via the air coupling.

The controller 70 may be a device dedicated to the circuit 30 and provided as part of the circuit, for example, as a component of a baseband chip. The controller 70 may include a CPU, a microcontroller, a microprocessor, a processing core, an FPGA, or similar. Memory, such as EEPROM may be provided as part of the controller 70 or for use by the controller 70. The controller 70 may be the processor 12 of FIG. 1.

The baseband circuit 16 and the radio circuit 18 may be provided on separate chips. A baseband chip may include the DAC 32, the ADC 44, the capture memory 64, memory to store the digital scale setting 62, and the playback memory 74. A radio chip may include the amplifiers 36, 50, the mixers 38, 52, and the oscillator 40.

In an example of a calibration operation, the controller 70 provides the calibration signal stored in playback memory 74 to the transmit path 34 and obtains from the receive path, such as from the capture memory 64, a loopback signal caused by wireless reception of the calibration signal by the receiver antenna 48. The controller 70 references this loopback signal to calibrate the transmit path 34. Calibration may include adjusting the digital scale setting 62, adjusting a gain of the transmit amplifier 36, a combination of such, or similar.

The controller 70 may be configured to control the gain setting of the transmit amplifier 36 using a RF radio register. It is contemplated that the transmit gain setting is not changed on a per-packet basis and is set once per RF channel. The controller 70 may be configured to target the transmit gain setting to a value at or near the 1 dB compression point (P1 dB). The transmit gain setting may be set to the same value for various modulation types.

The controller 70 may be configured to adjust the digital scale setting 62, which can be done on a per-packet basis or less often. The digital scale setting 62 may be adjusted dynamically and independently for different modulations. The controller 70 may be configured to establish a transmit gain setting before establishing the digital scale settings 62.

The controller 70 may be configured to calibrate the transmit path using an iterative process. The received air-coupled loopback signal may be compared to a programmable target, which may be stored at the controller 70 or in memory accessible to the controller 70. The calibration signal may then be adjusted if the loopback signal contravenes the programmable target. An example programmable target is a difference between calibration signal level and loopback signal level, wherein loopback signal level may be computed as one or more third-order intermodulation distortion (IM3) products. As the calibration signal is adjusted, the controller 70 compares the changing loopback signal to the programmable target and, when the loopback signal meets the programmable target, the controller 70 sets a transmit power of the transmit path based on the calibration signal. For instance, the most recent gain applied to the calibration signal may be used for data transmission. A programmable target may be set with an amount of margin, so that the calibrated transmit power may be used for an expected range of operating temperature without the need to recalibrate.

Figure 3:
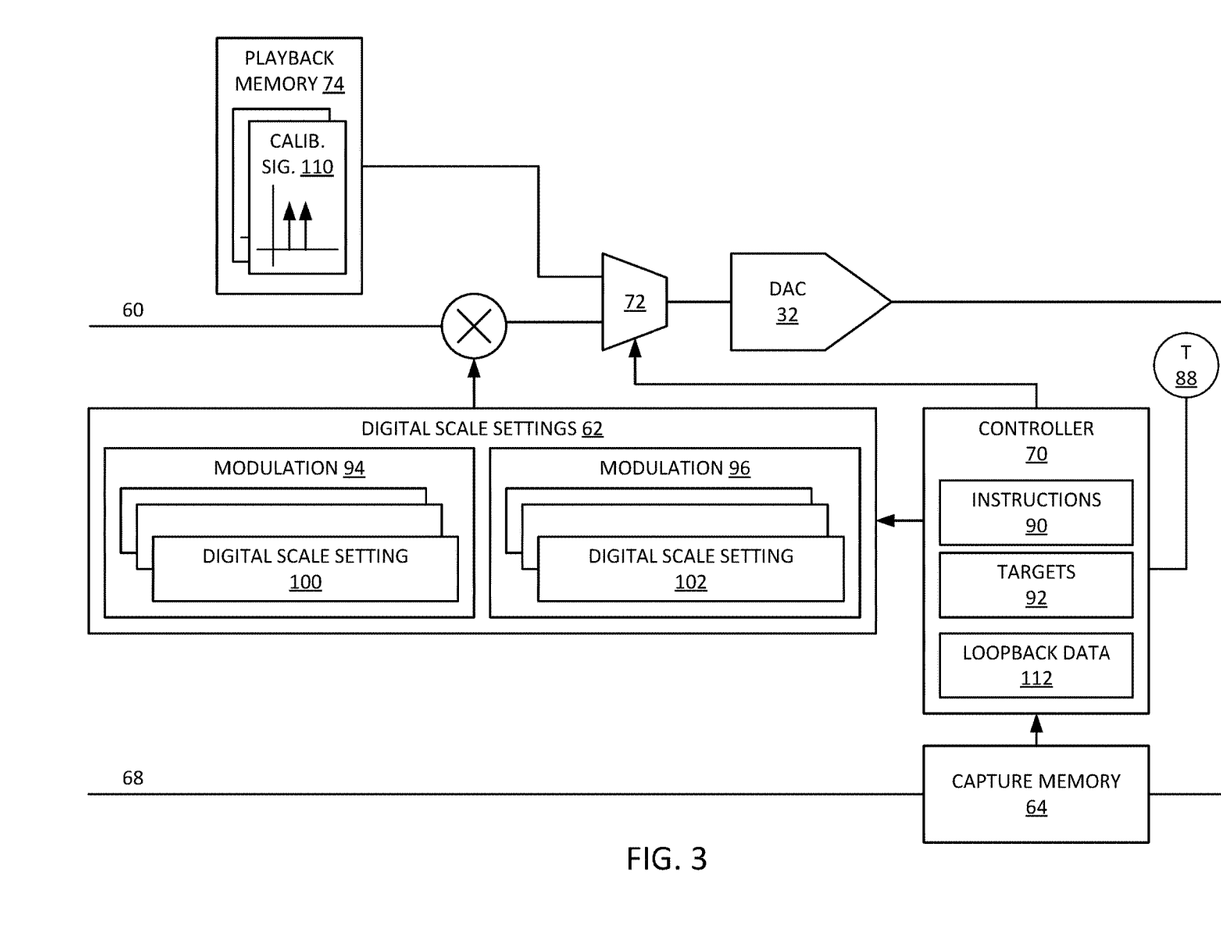
FIG. 3 is a schematic diagram of a transmit power back-off calibration circuit.

With reference to FIG. 3, a controller 70 may be configured to execute instructions 90 to carry out a calibration process described herein. The instructions 90 may include instructions to transmit a calibration signal and capture an air-coupled loopback signal. The instructions 90 may include instructions to implement digital signal processing of the loopback signal, such as determination of IM3 products, and comparison of the processed loopback signal to the calibration signal to determine a degree of transmitter compression. The controller 70 may store programmable targets 92 for reference during the process, and a programmable target 92 may be indicative of an allowable degree of transmitter compression. Each type of modulation may have its own programmable target 92.

The instructions 90 may also stipulate when the calibration process is to be performed. For example, the process may be performed periodically, at regular intervals, according to a programmable schedule, based on a temperature measurement, or according to another methodology. The circuit may include a temperature sensor 88, and the instructions 90 may cause calibration to be performed more frequently when temperature changes, i.e., as the chip initially heats up.

The controller 70 may be configured to reference different programmable targets 92 for different modulation types 94, 96, when choosing digital scale settings 62. The controller 70 may thus be configured to independently set a transmit power of the transmit path for each modulation type 94, 96 by choosing the digital scale setting 100, 102.

In one example, for each modulation type 94, 96, a different set of digital scale settings 100, 102 may be provided for the controller 70 to select. A lookup table may be used to associate scale factors (0.50, 1.00, etc.) with digital scale settings 100, 102 for various different modulation types 94, 96. The controller 70 may then use a determined scale factor to look up gain settings 100, 102 for the particular modulation type 94, 96 being considered.

A calibration signal 110 stored in the playback memory 74 may include a two-tone signal. Various pre-generated two-tone signals may be stored, for example, signals at various different levels and/or for different modulation types may be stored for selection during calibration.

The controller 70 may be configured to determine an IM3 product in the loopback signal obtained from the capture memory 64 in response to the over-the-air coupling of the transmitter and receiver when the calibration signal 110 is outputted via the transmit path. The controller 70 may be configured to compare this loopback data 112 to the calibration signal 110 transmitted, and then reference the comparison to calibrate the transmit path. The comparison may include taking a difference of power level between the two-tone calibration signal 110 and the IM3 product represented by the loopback data 112, where a larger difference represents less transmitter compression.

Figure 4:
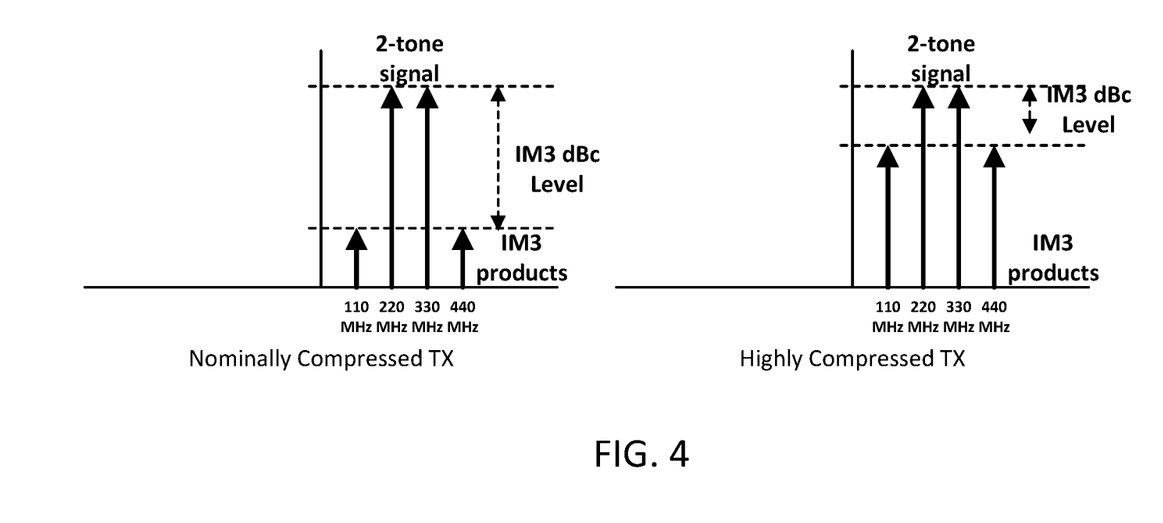
FIG. 4 shows graphs of two-tone signals vs third-order intermodulation distortion (IM3) products.

As shown in FIG. 4, transmitter compression performance may be determined by comparing a power level of a two-tone signal a power level of IM3 products. The difference between two-tone power level and the IM3 product power level is proportional to improved performance or decreased transmitter compression. That is, as the transmitter becomes more compressed, the IM3 products are stronger. By measuring dBc level of the IM3 products, the EVM of transmitter signals may be determined and transmitter gain may be controlled to increase or decrease, so as to respectively increase transmit power or reduce transmitter compression.

With reference back to FIG. 3, generating a two-tone calibration signal may include loading and continuously looping out a digital pattern representative of the two-tone calibration signal from playback memory 74 to the transmitter DAC 32. This signal is fed into the transmitter radio and out the transmitter antenna 42, as shown in FIG. 2. The two-tone signal along with any transmitter distortion (i.e., IM3 products) are coupled over the air 80 and received at the receiver antenna 48. The controller 70 triggers the receiver ADC 44 and associated capture memory 64 to capture this loopback signal. The digitized loopback signal is then processed by instructions 90 at the controller 70, which may include any suitable DSP algorithm to determine an IM3 dBc level or other indication of comparison. The controller 70 compares IM3 dBc level to one or more programmable targets to determine whether an increase or decrease in gain is required to achieve an acceptable level of transmitter compression. If the target is not achieved, the controller 70 adjusts transmitter gain by one or both of scaling a digital gain setting or setting a transmitter radio gain, and the looping and recapture performed again. Any number of iterations may be performed to arrive at convergence with the target. Once the target is achieved, the current transmitter gain may be used until the calibration process is to be performed again.

Figure 5:
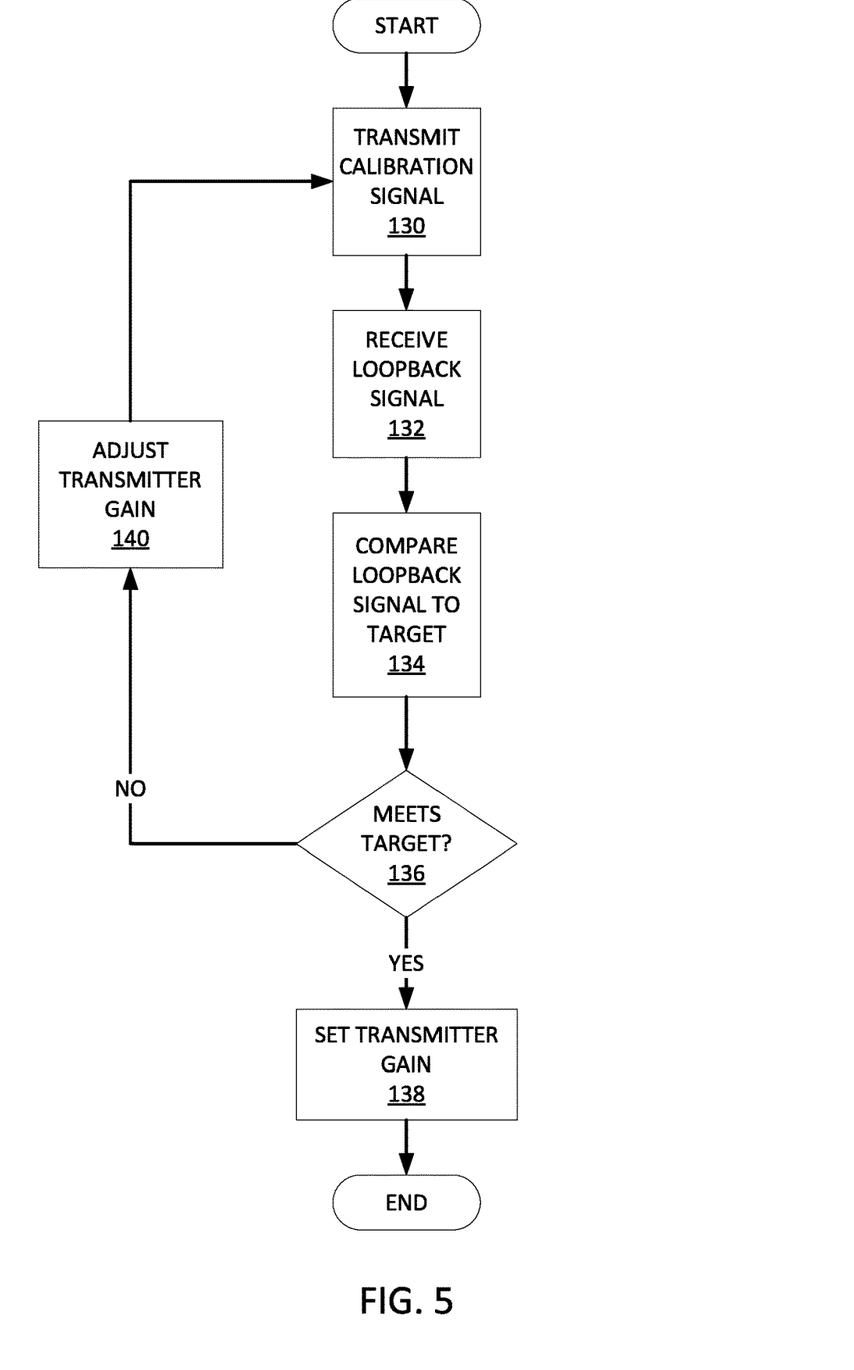
FIG. 5 is a flowchart of a process for performing a transmit power back-off calibration.

FIG. 5 shows a flowchart of a calibration process. The process may be used with any of the systems, devices, or circuits described herein or with other systems, devices, and circuits. The process may be performed periodically, regularly, according to a schedule, based on a measured temperature, or based on a similar condition. For example, the frequency that the process is performed may be proportional to temperature change, such that a high rate of temperature change means that the process is performed more frequently. A controller may be used to govern when the process is performed.

At block 130, a calibration signal, such as a two-tone signal, is transmitted from a transmitter antenna.

At block 132, a loopback signal is received at a receiver antenna contained in the same circuit or chip as the transmitter antenna. The loopback signal results from an air coupling of the receiver antenna and the transmitter antenna.

Then, at block 132, the loopback signal is compared to a target. This may include determining an IM3 product of the loopback signal and determining a difference between a power of the IM3 product and a power of the calibration signal. The power difference may then be compared to a target power difference. If the difference is too low, that is the IM3 products are at too high a level, then an iteration is performed. An upper bound may also be placed on the difference, such that an iteration is performed if the difference is too high, that is, if more compression can be tolerated. The degree of gain adjustment may be selected based on the degree of distance from the target, with higher distance causing a greater gain adjustment.

If the loopback signal does not meet the target, at block 136, then a gain of the calibration signal is adjusted, at block 140, and the method repeats blocks 130, 132, 134. For example, if the IM3 products are too high, then the gain of the calibration signal is reduced. Conversely, if the IM3 products are too low, then the gain of the calibration signal may be increased.

When the loopback signal meets the target, at block 138, the transmitter gain may be committed for data transmission during normal operation. The process ends until calibration is to be performed again. The process may be performed independently for different channels and/or modulation types.

Figure 6:
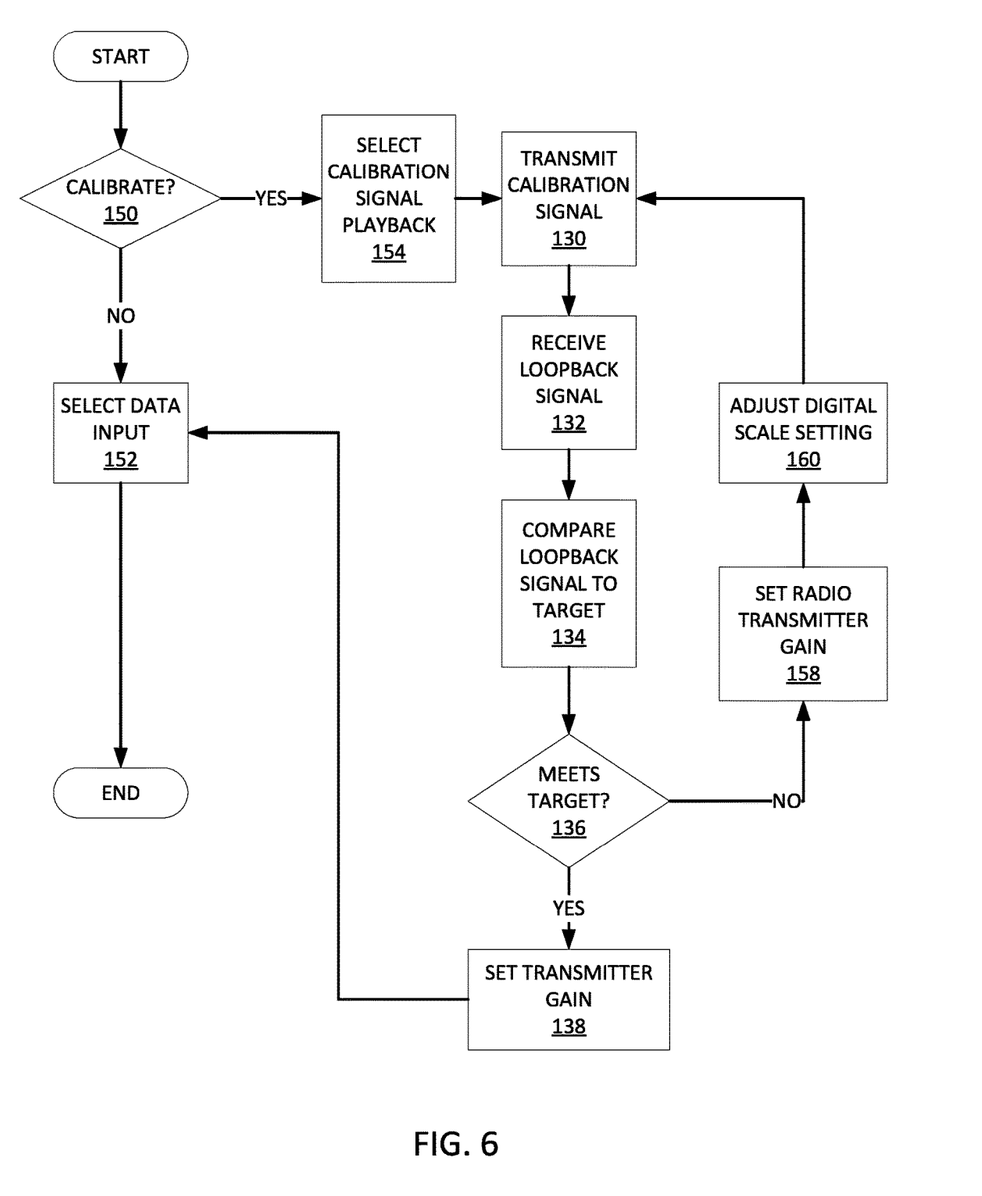
FIG. 6 is a flowchart of another process for performing a transmit power back-off calibration.

FIG. 6 shows a flowchart of another calibration process. The process may be used with any of the systems, devices, or circuits described herein or with other systems, devices, and circuits. The description of FIG. 5 may be referenced for description not repeated here.

At block 150 it is determined whether transmitter calibration is to be performed for a given channel and modulation type. Block 150 may include a periodic or regular trigger or a trigger based on temperature, or a combination of such. Background noise may also be a condition for calibration. If background noise it too high, the calibration is not performed, as accuracy may be compromised. When calibration is not to be performed, input data is selected for transmission during normal operation, at block 152.

If calibration is triggered, a calibration signal is selected for the transmit path, at block 154. The calibration signal is transmitted and the air-coupled loopback signal is received and compared to a target, at blocks 130-136. When the target is met, at block 138, the present calibration gain may be set as the transmitter gain and normal operation is resumed.

If the target is not met, the gain of the calibration signal is adjusted. This may include setting a radio transmitter gain, at block 158, such as by setting the transmitter gain. Further, the digital scale setting may be adjusted, at block 160. The particular modulation type being calibrated may be referenced when selecting a digital scale setting. That is, the digital scale setting may be modulation dependent and may be selected based on the modulation under calibration.

In addition, each RF channel may be provided with its own gain settings, such as a radio transmitter gain setting and a digital scale setting. When beginning the calibration process, a previous gain setting may be used as an initial value, as this may speed convergence. Further, channel switching may be taken as a trigger to start the calibration process.

It should be apparent from the above that a transmitter may be calibrated to reduce the risk of compression and increase or maximize performance. The undesirable effects of changes in operational conditions, such as temperature, are reduced or negated.

It should be recognized that features and aspects of the various examples provided above can be combined into further examples that also fall within the scope of the present disclosure. In addition, the figures are not to scale and may have size and shape exaggerated for illustrative purposes.

We claim:

1. A device comprising:
   a transmitter antenna;
   a receiver antenna;
   a circuit including a transmit path and a receive path, the transmit path to communicate transmit signals to the transmitter antenna for wireless transmission, the receiver antenna to receive wireless signals and provide the wireless signals to the receive path; and
   a controller to provide a calibration signal to the transmit path and obtain from the receive path a loopback signal caused by wireless reception of the calibration signal by the receiver antenna, wherein the calibration signal includes a two-tone signal, the controller further to determine a third-order intermodulation distortion product in the loopback signal and reference a comparison of the third-order intermodulation distortion product to the two-tone signal to calibrate the transmit path.

2. The device of claim 1, wherein the controller is further configured to calibrate the transmit path using an iterative process in which the loopback signal is compared to a programmable target, the calibration signal is adjusted if the loopback signal contravenes the programmable target, and a transmit power of the transmit path is set based on the calibration signal when the loopback signal meets the programmable target.

3. The device of claim 2, wherein the controller is further configured to reference different programmable targets for different modulation types, and wherein the controller is further configured to independently set a transmit power of the transmit path for each modulation type.

4. The device of claim 2, wherein the controller is configured to set the transmit power of the transmit path by adjusting a digital scale setting.

5. The device of claim 2, wherein the controller is configured to set the transmit power of the transmit path by setting a transmit gain of the transmit path.

6. A device comprising:
   a transmitter antenna;
   a receiver antenna; and
   a circuit to communicate signals between a processor and the transmitter antenna and between the processor and the receiver antenna, the circuit to transmit a calibration signal from the transmitter antenna and receive a loopback signal at the receiver antenna; the loopback signal resulting from an air coupling of the receiver antenna and the transmitter antenna: the circuit further to compare the loopback signal to a target, including determining a third-order intermodulation distortion product of the loopback signal and determining a difference between a power of the third-order intermodulation distortion product and a power of the calibration signal; if the loopback signal does not meet the target, the circuit to adjust a gain of the calibration signal and receive the loopback signal and compare the loopback signal to the target to determine whether the loopback signal meets the target; and when the loopback signal meets the target, the circuit to take the gain as a calibrated transmitter gain.

7. The device of claim 6, wherein the circuit is to select playback of the calibration signal during a calibration process and to select a data input for transmission during operation.

8. A method of calibrating a transmitter, the method comprising:
   transmitting a calibration signal from a transmitter antenna;
   receiving a loopback signal at a receiver antenna, the loopback signal resulting from an air coupling of the receiver antenna and the transmitter antenna;
   comparing the loopback signal to a target, including determining a third-order intermodulation distortion product of the loopback signal and determining a difference between a power of the third-order intermodulation distortion product and a power of the calibration signal;
   if the loopback signal does not meet the target, then adjusting a gain of the calibration signal and performing the receiving and comparing to determine whether the loopback signal meets the target; and when the loopback signal meets the target, taking the gain as a calibrated transmitter gain.

9. The method of claim 8, wherein adjusting the gain of the calibration signal comprises adjusting a digital scale setting.

10. The method of claim 9, wherein adjusting the gain of the calibration signal comprises selecting a digital scale setting with reference to a modulation.

11. The method of claim 8, wherein adjusting the gain of the calibration signal comprises setting a gain of a transmitter radio circuit.

12. The method of claim 8, further comprising selecting the calibration signal from playback memory for transmission and then selecting data input for transmission after the loopback signal meets the target.

\* \* \* \* \*